United States Patent
Rosén

(10) Patent No.: US 11,578,882 B2
(45) Date of Patent: Feb. 14, 2023

(54) COMBINED HEATING AND COOLING SYSTEM

(71) Applicant: E.ON Sverige AB, Malmö (SE)

(72) Inventor: Per Rosén, Lund (SE)

(73) Assignee: E. ON SVERIGE AB, Malmö (SE)

( * ) Notice: Subject to any disclaimer, the term of this patent is extended or adjusted under 35 U.S.C. 154(b) by 1041 days.

(21) Appl. No.: 16/313,910

(22) PCT Filed: Jun. 29, 2017

(86) PCT No.: PCT/EP2017/066127
§ 371 (c)(1),
(2) Date: Dec. 28, 2018

(87) PCT Pub. No.: WO2018/007234
PCT Pub. Date: Jan. 11, 2018

(65) Prior Publication Data
US 2021/0231319 A1    Jul. 29, 2021

(30) Foreign Application Priority Data

Jul. 7, 2016 (EP) ..................... 16178378

(51) Int. Cl.
*F24F 5/00*       (2006.01)
*F24F 11/84*      (2018.01)
(Continued)

(52) U.S. Cl.
CPC .............. *F24F 5/0003* (2013.01); *F24D 3/18* (2013.01); *F24D 10/003* (2013.01);
(Continued)

(58) Field of Classification Search
CPC ..... F24F 11/84; F24F 2221/54; F24D 10/003; F24D 19/1012; F24D 2220/0207; F24D 2220/042
See application file for complete search history.

(56) References Cited

U.S. PATENT DOCUMENTS

| 2010/0018668 A1* | 1/2010 | Favrat ..................... F24D 12/02 |
| | | 165/104.34 |
| 2017/0030590 A1* | 2/2017 | Van .......................... F24F 3/10 |

FOREIGN PATENT DOCUMENTS

| DE | 20 2011 106855 U1 | 11/2011 |
| DE | 10 2010 035326 A1 | 3/2012 |

(Continued)

OTHER PUBLICATIONS

Office Action dated Mar. 26, 2021, in corresponding Japanese patent Application No. 2018-567739, 18 pages.

(Continued)

*Primary Examiner* — Henry T Crenshaw
(74) *Attorney, Agent, or Firm* — Xsensus LLP

(57) ABSTRACT

A combined cooling and heating system including a district cooling grid having a feed conduit for an incoming flow of cooling fluid having a first temperature, and a return conduit for a return flow of cooling fluid having a second temperature, the second temperature being higher than the first temperature; a local cooling system being configured to absorb heat from a first building and comprising a heat exchanger having a heat exchanger inlet and a heat exchanger outlet; and a local heating system being configured to heat the first or a second building and comprising a heat pump having a heat pump inlet and a heat pump outlet. The heat exchanger inlet is connected to the feed conduit of the district cooling grid; and the heat pump inlet is connected to the return conduit of the district cooling grid and to the heat exchanger outlet.

14 Claims, 3 Drawing Sheets

(51) Int. Cl.
*F24D 3/18* (2006.01)
*F24D 10/00* (2022.01)
*F24D 19/10* (2006.01)
*G05B 15/02* (2006.01)
*G05D 23/19* (2006.01)

(52) U.S. Cl.
CPC ..... *F24D 19/1012* (2013.01); *F24D 19/1039* (2013.01); *F24F 11/84* (2018.01); *G05B 15/02* (2013.01); *G05D 23/1917* (2013.01); *F24D 2200/13* (2013.01); *F24D 2220/0207* (2013.01); *F24D 2220/042* (2013.01); *F24F 2221/54* (2013.01)

(56) References Cited

FOREIGN PATENT DOCUMENTS

| | | |
|---|---|---|
| DE | 20 2012 103891 U1 | 12/2012 |
| DE | 10 2014 005 003 A1 | 10/2015 |
| EP | 0 150 671 A1 | 8/1985 |
| JP | H04-45332 A | 2/1992 |
| JP | H06-2891 A | 1/1994 |
| JP | 09-507705 A | 8/1997 |
| JP | H09-507707 A | 8/1997 |
| KR | 10-2008-0093676 A | 10/2008 |
| KR | 10-1107090 B1 | 1/2012 |
| WO | 95/08083 A1 | 3/1995 |
| WO | 95/20135 A1 | 7/1995 |
| WO | 2002/090382 A1 | 11/2002 |
| WO | 2008/102292 A2 | 8/2008 |
| WO | 2010/145040 A1 | 12/2010 |

OTHER PUBLICATIONS

English translation of Office Action dated Jan. 25, 2022, in corresponding Brazilian patent Application No. BR20181176779, 2 pages.
Decision to Grant a Patent dated Jan. 7, 2022, in corresponding Japanese patent Application No. 2018-0567739, 5 pages.
Office Action dated Sep. 21, 2020, in corresponding Chinese Application No. 201780040923.1, 16 pages.
International Search Report dated Jan. 22, 2018 for PCT/EP2017/066127 filed on Jun. 29, 2017, 15 pages.
Notice of Allowance dated Aug. 30, 2020 in Korean Patent Application No. 10-2018-7037495, 2 pages.
Mexican Office Action dated Sep. 23, 2022 in corresponding PCT Patent Application No. MX/a/2018/016409, 3 pages.

\* cited by examiner

COMBINED HEATING AND COOLING SYSTEM

CROSS-REFERENCE TO RELATED APPLICATIONS

This application is a National Stage Application based on PCT/EP2017/066127, filed on 29 Jun. 2017, and claims priority to European Patent Application No. 16178378.2, filed on 7 Jul. 2016, the entire contents of which being incorporated herein by reference.

FIELD OF THE INVENTION

The invention relates to a combined heating and cooling system in which a local heating system of a building and a local cooling system of a building interacts with a district cooling grid.

BACKGROUND OF THE INVENTION

Nearly all large developed cities in the world have at least two types of energy distribution grids incorporated in their infrastructures: one grid for providing heating and one grid for providing cooling. The grid for providing heating may e.g. be used for providing comfort and/or process heating, and/or hot tap water preparation. The grid for providing cooling may e.g. be used for providing comfort cooling and/or process cooling.

A common grid for providing heating is a gas grid or an electrical grid providing comfort and/or process heating, and/or hot tap water preparation. An alternative grid for providing heating is a district heating grid. The district heating grid is used for providing heated heat transfer fluid, typically in the form of water, to buildings of the city. A centrally placed heating and pumping plant is used for heating and distributing the heated heat transfer fluid. The heated heat transfer fluid is delivered to the buildings via one or more feed conduits and is returned to the heating and pumping plant via one or more return conduits. Locally at a building, heat from the heated heat transfer fluid is extracted via a heat pump.

A common grid for providing cooling is the electrical grid. The electricity may e.g. be used for running refrigerators or freezers or for running air conditioners for providing comfort cooling. An alternative grid for providing cooling is a district cooling grid. The district cooling grid is used for providing cooled heat transfer fluid, typically in the form of water, to buildings of the city. A centrally placed cooling and pumping plant is used for cooling and distributing the thus cooled heat transfer fluid. The cooled heat transfer fluid is delivered to the buildings via one or more feed conduits and is returned to the cooling and pumping plant via one or more return conduits. Locally at a building, cold from the cooled heat transfer fluid is extracted via a heat pump.

The use of energy for heating and/or cooling is steadily increasing, influencing the environment negatively. By improving utilization of the energy distributed in the energy distribution grids, negative influences on the environment may be reduced. Hence, there is a need for improving utilization of the energy distributed in energy distribution grids, including existing grids. Provision of heating/cooling also requires huge investments when it comes to engineering projects and there is a constant strive to cut the costs. Hence, there is a need for improvements in how to provide sustainable solutions to heating and cooling of a city.

SUMMARY OF THE INVENTION

It is an object of the present invention to solve at least some of the problems mentioned above.

According to a first aspect a combined cooling and heating system is provided. The combined system comprises: a district cooling grid having: a feed conduit for an incoming flow of cooling fluid having a first temperature in the range of 4-12° C. and a return conduit for a return flow of cooling fluid having a second temperature, the second temperature being higher than the first temperature, the second temperature being in the range of 10-18° C.; a local cooling system being configured to absorb heat from a first building and comprising a heat exchanger having a heat exchanger inlet and a heat exchanger outlet; and a local heating system being configured to heat the first or a second building and comprising a heat pump having a heat pump inlet and a heat pump outlet; wherein the heat exchanger inlet is connected to the feed conduit of the district cooling grid; and wherein the heat pump inlet is connected to the return conduit of the district cooling grid and to the heat exchanger outlet.

According to the invention, the district cooling grid serves the dual purpose of both serving a local cooling system of a building and a local heating system of a building. The two local systems may be arranged in one and the same building but may also be arranged in different buildings. The local cooling system is typically a system used to provide comfort cooling whereas the local heating system is typically a system used to heat the building and/or to heat tap water. By using the district cooling grid for this new dual purpose, heavy investments in the provision of access to both a district cooling grid and a district heating grid may be avoided or greatly reduced. The combined system may be installed in an existing district cooling grid.

Also, the energy available in both the feed conduit and the return conduit is used. The heat energy available in the return conduit of a district cooling grid is conventionally considered as waste energy, however by the inventive system, that waste heat energy may now be used to lower the energy consumption required to operate the heat pump of the local heating system since the inlet of the heat pump may be provided with "preheated" heating fluid. This reduces the load on the heat pump whereby the designed capacity of the heat pump may be reduced and also the overall investment cost.

The heat pump inlet, the heat exchanger outlet, and the return conduit may be interconnected.

The heat exchanger inlet may be connected to the heat pump outlet. The fluid leaving the heat pump outlet is typically warmer than the cooling fluid in the feed conduit of the district cooling grid. Instead of discharging this heated fluid into the return conduit of the district cooling grid and hence treating the heat energy as waste energy it may be used as valuable input energy to the heat exchanger. This reduces the load on the heat exchanger whereby the designed capacity of the heat exchanger may be reduced and also thereby the overall investment cost.

The heat exchanger inlet, the heat pump outlet and the feed conduit may be interconnected.

The combined cooling and heating system may further comprise a further local heating system being configured to heat a third building, the further local heating system comprising a further heat pump having an inlet connected to the return conduit of the district cooling grid and an outlet connected to the feed conduit of the district cooling grid.

The further local heating system may be used to provide heat to the building, i.e. comfort heat and/or to heat tap water. The third building may be a building used for other purposes than the first building and thereby requiring heating/cooling at different times during day or night. In one example the first building may be an office building or a business premise requesting tempering during daytime, while the third building is a residential home requesting tempering primarily during evenings, nights and weekends.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

These and other aspects of the present invention will now be described in more detail, with reference to the appended drawings showing embodiments of the invention. The figures are provided to illustrate the general structures of embodiments of the present invention. Like reference numerals refer to like elements throughout.

DETAILED DESCRIPTION

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and to fully convey the scope of the invention to the skilled person.

Figure 1:
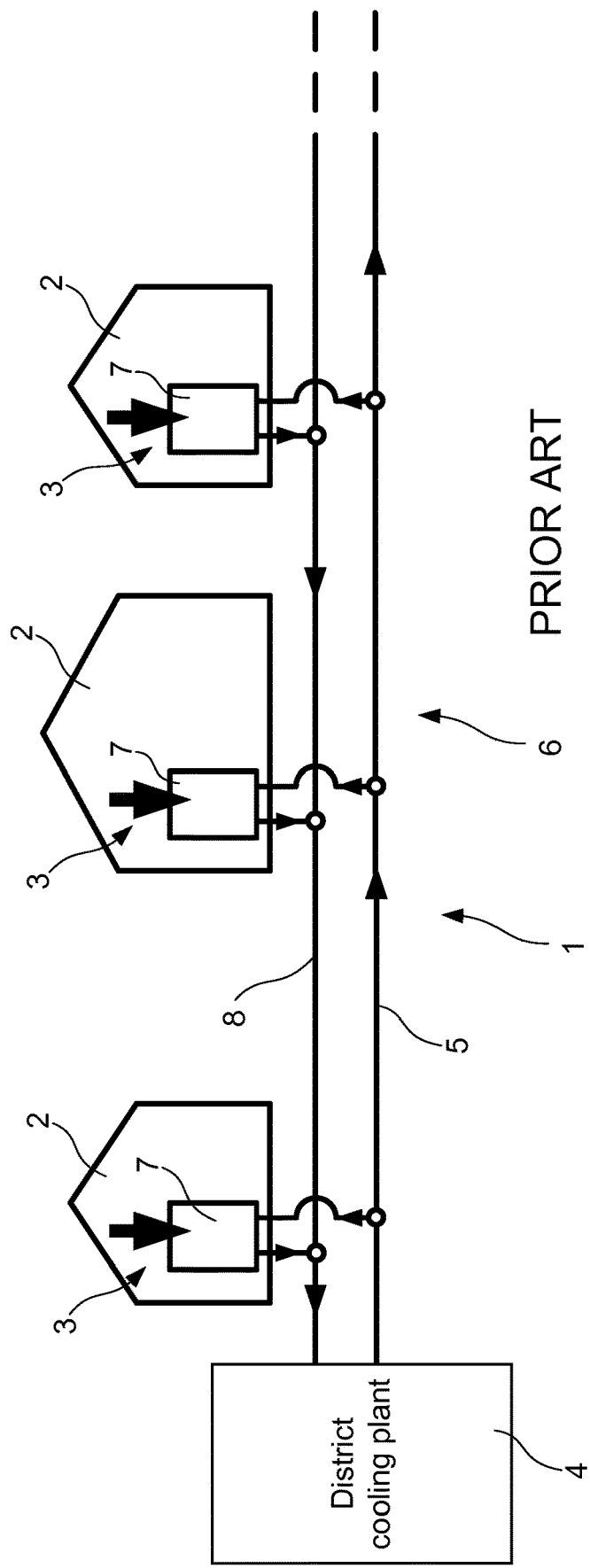
FIG. 1 is a schematic diagram of a prior art district cooling grid interacting with buildings, each having a local cooling system.

In connection with FIG. 1 a district cooling grid 1 according to prior art will be discussed. The district cooling grid 1 is formed by one or several hydraulic networks (not disclosed) that deliver a cooling fluid to local cooling systems 3 which are arranged in buildings 2 such as office buildings, business premises, residential homes and factories in need for cooling. A typical district cooling grid 1 comprises a district cooling plant 4 which cools the cooling fluid. The district cooling plant may by way of example be a power plant using lake water. The cooled cooling fluid is transported via a feed conduit 5 forming part of a conduit net work 6 to locally distributed consuming cooling devices 7 which are arranged in the buildings 2. It goes without saying that one and the same building 2 may comprise several consuming cooling devices 7. Examples of consuming cooling devices 7 are air-conditioners and refrigerators.

When the cooling of the cooled cooling fluid is consumed in the consuming cooling devices 7 the temperature of the cooling fluid is raised and the thus heated cooling fluid is returned to the district cooling plant 4 via a return conduit 8 forming part of the conduit net work 6.

District cooling grids 1 are used to satisfy comfort cooling demands. The temperature of the cooling fluid in the feed conduits 5 is typically between 4-12° C. The return temperature in the return conduits 8 is typically between 10-18° C.

The driving pressure difference between feed conduits and return conduits of the hydraulic network always creates a so called "pressure cone" whereby the pressure in the feed conduits 5 is higher than the pressure in the return conduits 8. This pressure difference circulates the cooling fluid in the hydraulic network between the district cooling plant and the cooling consumption devices.

The conduits used in a district cooling grid 1 are normally plastic un-insulated conduits designed for a maximum pressure of either 0.6 or 1 MPa and maximum temperature of about 50° C. Also, the cooling fluid and hence energy carrier is typically water, although it is to be understood that other fluids or mixture of fluids may be used. Some non-limiting examples are ammonia, anti-freezing liquids (such as glycol), oils and alcohols. A non-limiting example of a mixture is water with an anti-freezing agent, such as glycol, added thereto. The energy content of the returned cooling fluid is according to prior art considered as waste energy.

Figure 2:
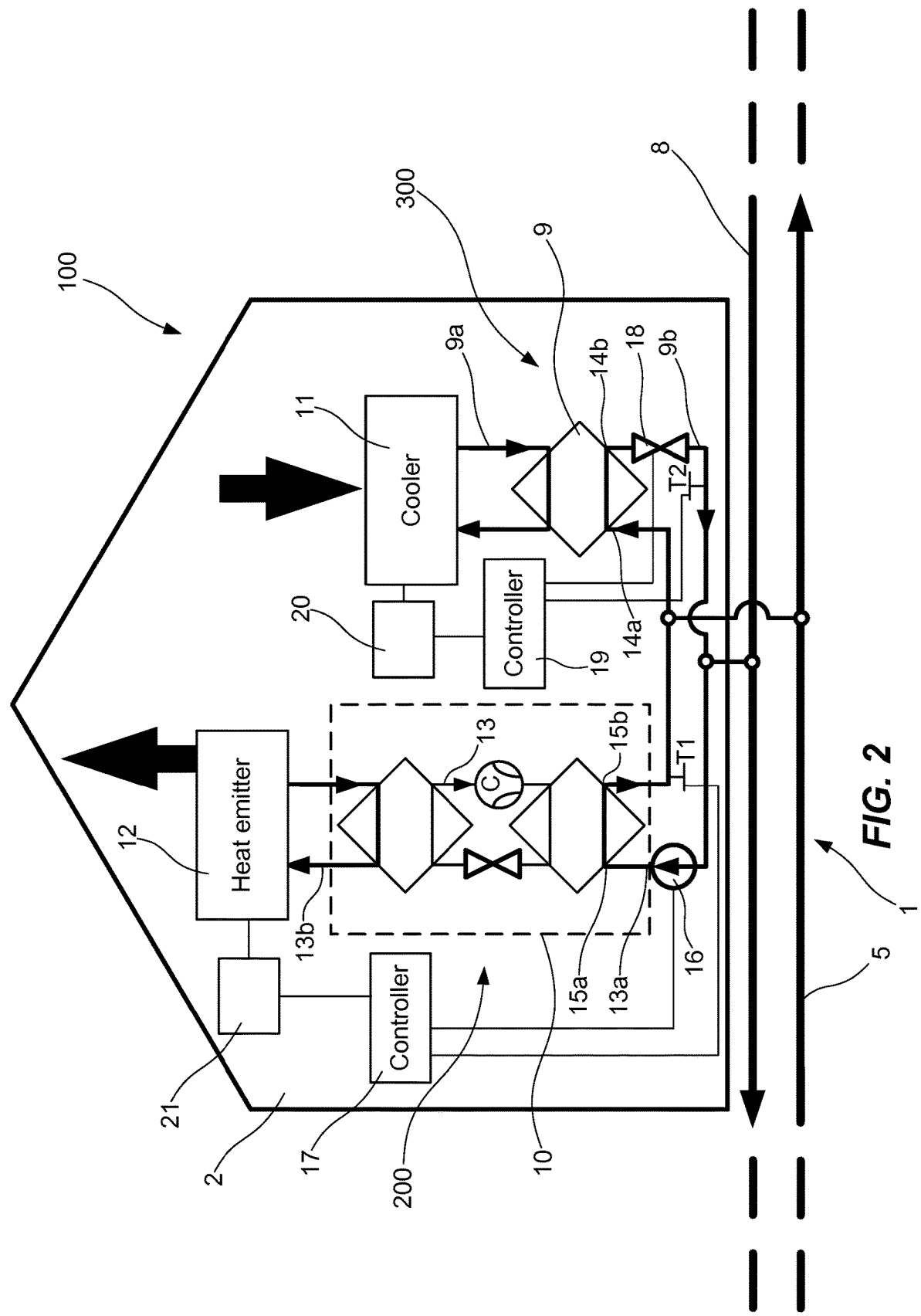
FIG. 2 is a schematic diagram of the inventive combined heating and cooling system.

Reference is now made to FIG. 2 which schematically discloses the inventive combined cooling and heating system 100. In its broadest sense the combined cooling and heating system comprise a local heating system 200 and a local cooling system 300. The two local systems 200, 300 can be arranged in one and the same building 2, as is disclosed in FIG. 2, or in separate buildings. The two systems 200, 300 are connected to a district cooling grid 1. To ease the understanding, the district cooling grid 1 is disclosed by a portion of a feed conduit 5 and a portion of a return conduit 8. The local cooling system 300 interconnects with the district cooling grid 1 via a heat exchanger 9. The local heating system 200 interconnects with the district cooling grid via a heat pump 10.

The district cooling grid 1 has the same design as previously described with reference to FIG. 1 and to avoid undue repetition, reference is made to the sections above describing the district cooling grid 1. However, in connection with the present invention the district cooling system 1 is not solely used for cooling purposes.

The local cooling system 300 comprises a cooler 11. Coolers 11 are as such well known in the art and may be used e.g. for comfort cooling in buildings such as office buildings, business premises, residential homes and factories in need for cooling.

The cooler 11 is connected to the district cooling grid 1 via a heat exchanger 9. Heat exchangers as such are well known in the art and can basically be described as comprising an arrangement of a first closed circuit 9a circulating a first fluid having a first temperature, and a second closed circuit 9b circulating a second fluid having a second temperature. By the two circuits 9a, 9b along an extension closely abutting each other a heat transfer takes place between the two fluids. In the local cooling system 300 connected to the district cooling grid, the first circuit 9a is locally arranged in the building 2 and the second circuit 9b forms part of the district cooling grid 1. Heat exchangers to be used for local cooling systems of buildings are typically situated in air ducts of ventilation or distributed through fan-driven air-coil collectors or ceiling mounted cooling batteries in individual spaces of a building. Process cooling may however be directly connected to the heat exchanger itself.

In the context of the invention the term "an inlet 14a of the heat exchanger 9" is to be interpreted as the inlet via which the heat exchanger 9 is fed with cooling fluid from the district cooling grid 1. Likewise, the term "14b outlet of the heat exchanger 9" is to be interpreted as the outlet via which the heat exchanger 9 returns cooling fluid to the district cooling grid 1.

The local heating system 200 comprises a heat emitter 12. Heat emitters 12 are as such is well known in the art and may be used e.g. for comfort heating buildings such as office buildings, business premises, residential homes and factories, and/or to heat tap water.

The heat emitter 12 is interconnected to the district cooling grid 1 via the heat pump 10. Heat pumps 10 as such are well known in the art and basically comprises a closed circuit 13 in which a brine is circulated between a first heat exchanger and a second heat exchanger. The first heat exchanger has an inlet 15a and an outlet 15b via which the heat pump 10 is connected to a first circuit 13a circulating a flow of a first fluid, in this case the cooling fluid of the district cooling grid 1. Likewise, the second heat exchanger has an inlet and an outlet via which the heat pump 10 is connected to a second circuit 13b circulating a flow of a second fluid, in this case the heating fluid of the local heating system 200. The heating fluid in the local heating system is typically water, although it is to be understood that other fluids or mixture of fluids may be used. Some non-limiting examples are ammonia, anti-freezing liquids (such as glycol), oils and alcohols. A non-limiting example of a mixture is water with an anti-freezing agent, such as glycol, added thereto.

In the context of the invention the term "inlet 15a of the heat pump 10" is to be interpreted as the inlet in the first circuit 13a via which the heat pump 10 is supplied with the cooling fluid of the district cooling grid 1. Likewise, the term "outlet 15b of the heat pump 10" is to be interpreted as the outlet in the first circuit 13a, via which the heat pump 10 returns cooling fluid to the district cooling grid 1.

In the following the connection between the district cooling grid 1 and the heat exchanger 9 and the heat pump 10, respectively, will be disclosed.

The inlet 14a of the heat exchanger 9 is connected to the feed conduit 5 of the district cooling grid 1. Also, the inlet 14a of the heat exchanger 9 is connected to the outlet 15b of the heat pump 10.

The outlet 14b of the heat exchanger 9 is connected to the return conduit 8 of the district cooling grid 1. Also, the outlet 14b of the heat exchanger 9 is connected to the inlet 15a of the heat pump 10.

The inlet 15a of the heat pump 10 is connected to the return conduit 8 of the district cooling grid 1. Also, the inlet 15a of the heat pump 10 is connected to the outlet 14b of the heat exchanger 9.

The outlet 15b of the heat pump 10 is connected to the feed conduit 5 of the district cooling grid 1. Also, the outlet 15b of the heat pump 10 is connected to the inlet 14a of the heat exchanger 9.

In the disclosed embodiment the inlet 15a of the heat pump 10, the outlet 14b of the heat exchanger 9, and the return conduit 8 are interconnected. Also, the inlet 14a of the heat exchanger 9, the outlet 15b of the heat pump 10, and the feed conduit 5 are interconnected.

By this interconnection between the heat exchanger 9 and the heat pump 10 and the district cooling grid 1, respectively, the energy content that is resulting from the operation of the heat pump 10 and the heat exchanger 9, respectively, and which energy content according to prior art is considered as waste energy, is used as valuable input energy when operating the heat pump 10 and the heat exchanger 9, respectively.

More precisely, the waste heat resulting from the heat exchanger 9 cooling the cooling fluid in the local cooling system 300 may be transferred to the cooling fluid that is fed as input to the heat pump 10. Likewise, the waste cooling resulting from the heat pump 10 heating the heating fluid in the local heating system 200 may be transferred to the cooling fluid that is fed as input to the heat exchanger 9.

The local heating system 200 may further comprises a pump 16. The pump 16 is configured to overcome the pressure difference between the return conduits 8 and the feed conduit 5. The pump 16 is further configured to regulate the flow of cooling fluid flowing through the heat pump 10. By regulating the flow of cooling fluid trough the heat pump 10, and at the same time optionally control the operation of the heat pump 10, the temperature of the cooling fluid outputted from the heat pump 10 may be controlled. The pump 16 may be controlled by a first controller 17. The first controller 17 may control the pump 16 based on data pertaining to heating demands of the heat emitter 12 and/or data pertaining to the temperature of the cooling fluid in the outlet 15b of the heat pump 10. Data pertaining to heating demands of the heat emitter 12 may be determined by means of a heat demand sensor 21 connected to the heat emitter 12. Data pertaining to the temperature of the cooling fluid in the outlet 15b of the heat pump 10 may be determined by means of a temperature sensor T1 connected to the outlet 15b. In the in FIG. 2 shown embodiment the pump 16 is arranged in the inlet 15a of the heat pump 10. However, the pump 16 may alternatively be arranged in the outlet 15b of the heat pump 10.

The local cooling system 300 may further comprises a flow valve 18. The flow valve 18 is configured to regulate the flow of cooling fluid flowing through the heat exchanger 9. By regulating the flow of cooling fluid trough the heat exchanger 9, and at the same time optionally control the operation of the heat exchanger 9, the temperature of the cooling fluid outputted from the heat exchanger 9 may be controlled. The flow valve 18 may be controlled by a second controller 19. The second controller 19 may control the flow valve 18 based on data pertaining to cooling demands of the cooler 11 and/or data pertaining to the temperature of the cooling fluid in the outlet 14b of the heat exchanger 9. Data pertaining to cooling demands of the cooler 11 may be determined by means of a cooling demand sensor 20 connected to the cooler 11. Data pertaining to the temperature of the cooling fluid in the outlet 14b of the heat exchanger 9 may be determined by means of a temperature sensor T2 connected to the outlet 14b. In the in FIG. 2 shown embodiment the flow valve 18 is arranged in the outlet 14b of the heat exchanger 9. However, the flow valve 18 may alternatively be arranged in the inlet 14a of the heat exchanger 9.

In the in FIG. 2 shown embodiment the first and second controllers 17, 19 are illustrated as separate controllers. However, alternatively the first and second controllers 17, 19 may be combined into a single controller.

Figure 3:
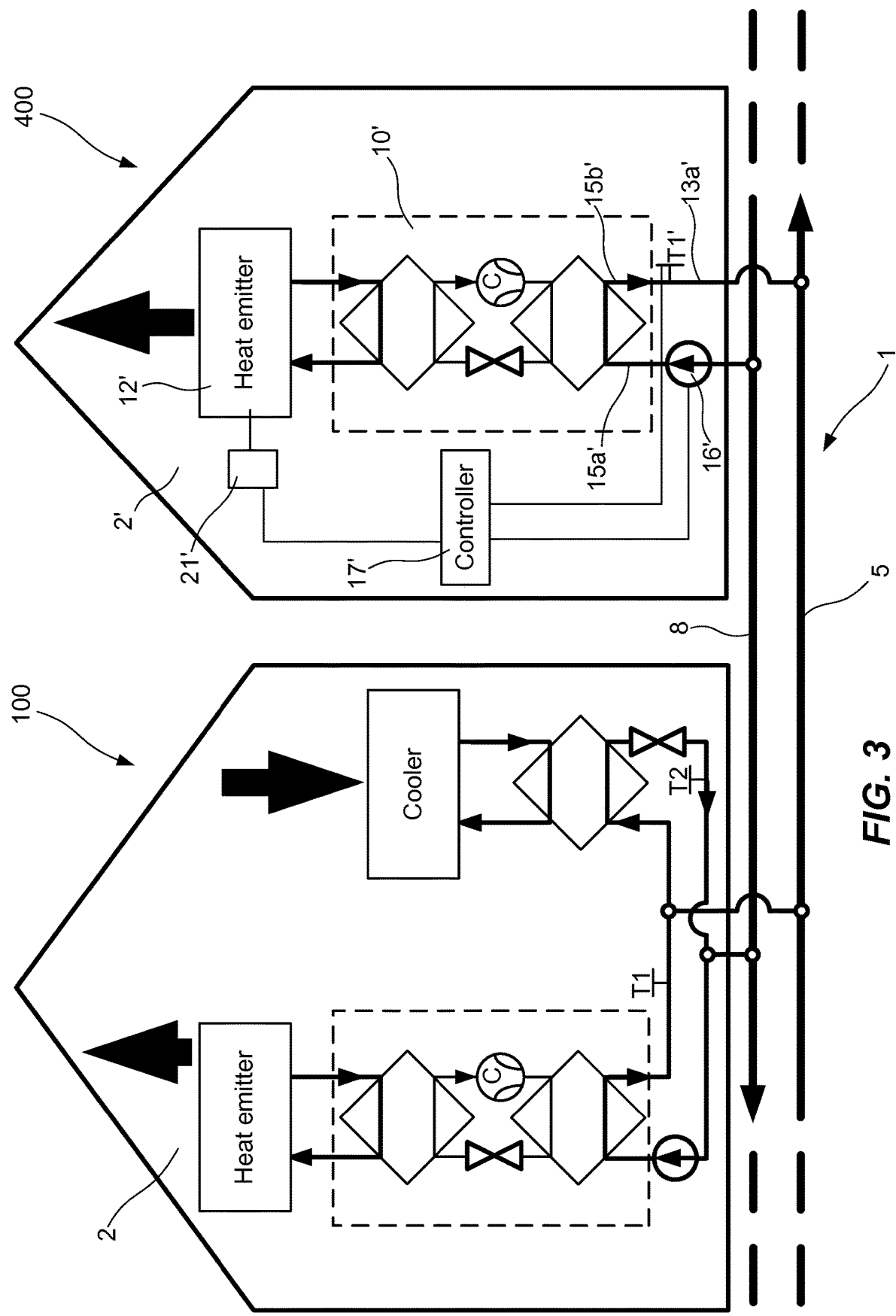
FIG. 3 is a schematic diagram of the inventive combined heating and cooling system comprising a further local heating system arranged in a separate building.

Now turning to FIG. 3, the combined cooling and heating system 100 may further comprise a further local heating system 400 arranged in a third building 2', separate from the other building/-s 2. The third building 2' may by way of example by a residential building. Except from the further local heating system 400 the combined cooling and heating system 100 is identical with that as previously described with reference to FIG. 2. To avoid undue repetition only the further local heating system 400 is described in detail below.

The specific embodiment to be described below resides in the surprising discovery to use the waste energy accessible in the return conduit 8 of the district cooling grid 1 as a heating source of a building 2', no matter if it is for comfort heating or heating tap water.

The further local heating system 400 has the same overall design as that forming part of the combined cooling and heating system 100 and which has been described in detail with reference to FIG. 2. Hence, the additional local heating system 400 comprises a heat emitter 12' which is arranged in the building 2'. The heat emitter 12' is connected to the district cooling grid 1 via a heat pump 10'. In the context of the invention, the term "inlet 15a' of the heat pump 10'" is to be interpreted as the inlet in the first circuit 13a' via which the heat pump is fed with the cooling fluid of the district cooling grid 1. Likewise, the term "outlet 15b" of the heat pump 10'" is to be interpreted as the outlet in the first circuit 13a', via which the heat pump returns cooling fluid to the district cooling grid 1.

The inlet 15a' of the heat pump 10' is connected to the return conduit 8 of the district cooling grid 1 and the outlet 15b' of the heat pump 10' is connected to the feed conduit 5 of the district cooling grid 1. Accordingly, by this arrangement the inlet 15a' of the heat pump 10' may be supplied with heated cooling fluid from the return conduit 8 of the district cooling grid 1. Thus, the heat of the heated cooling fluid in the return conduit 8 that according to prior art is considered as waste energy is used as input to the heat pump 10'. Also since, by this arrangement, the outlet 15b' of the heat pump 10' is connected to the feed conduit 5 of the district cooling grid 1, the cooled cooling fluid delivered as output from the heat pump 10' is supplied to the feed conduit 5 of the local district cooling grid 1 where it intermixes with the flow of cooled cooling fluid.

Accordingly, the additional local heating system 400 uses heat that is accessible in the return conduit 8 of the district cooling grid 1 and which according to prior art is considered as waste energy. The waste energy is used as input to the heat pump 10'. The heat pump 10' is thereby supplied with a pre-heated fluid whereby the energy consumption of the heat pump 10' may be reduced. This lowers the overall energy cost to operate the building 2', and also the overall investment in the building. The reduced investments reside in the fact that the required capacity of the heat pump may be reduced. Likewise, the expected life length of the heat pump may be prolonged due to reduced load. Also, the invention allows an existing infrastructure of a district cooling grid to be used not only for cooling but also for heating.

The local heating system 400 may further comprises a pump 16'. The pump 16' is configured to overcome the pressure difference between the return conduits 8 and the feed conduit 5. The pump 16' is further configured to regulate the flow of cooling fluid flowing through the heat pump 10'. By regulating the flow of cooling fluid trough the heat pump 10', and at the same time optionally control the operation of the heat pump 10', the temperature of the cooling fluid outputted from the heat pump 10' may be controlled. The pump 16' may be controlled by a controller 17'. The controller 17' may control the pump 16' based on data pertaining to heating demands of the heat emitter 12' and/or data pertaining to the temperature of the cooling fluid in the outlet 15b' of the heat pump 10'. Data pertaining to heating demands of the heat emitter 12' may be determined by means of a heat demand sensor 21' connected to the heat emitter 12'. Data pertaining to the temperature of the cooling fluid in the outlet 15b' of the heat pump 10' may be determined by means of a temperature sensor T1' connected to the outlet 15b'. In the in FIG. 3 shown embodiment the pump 16' is arranged in the inlet 15a' of the heat pump 10'. However, the pump 16' may alternatively be arranged in the outlet 15b' of the heat pump 10'.

Additionally, variations to the disclosed embodiments can be understood and effected by the skilled person in practicing the claimed invention, from a study of the drawings, the disclosure, and the appended claims.

The combined cooling and heating system has been exemplified with two temperature sensors T1-T2. It is to be understood that the number of sensors and their positions may change. It is also to be understood that additional sensors may be introduced to the system depending on desired input to the first and second controllers 17, 19 and desired complexity. Especially, the first and second controllers 17, 19 may be arranged to communicate with the heat emitters 12 and coolers 11 locally arranged in the buildings 2 to take local settings into account.

The invention claimed is:

1. A combined cooling and heating system, comprising:
   a district cooling grid used to satisfy comfort cooling demands, the district cooling grid having:
      a feed conduit conducting an incoming flow of a cooling fluid in the form of water or water with an anti-freezing agent added thereto, the incoming flow of cooling fluid having a first temperature in the range of 4-12° C., and
      a return conduit conducting a return flow of the cooling fluid having a second temperature, the second temperature being in the range of 10-18° C. and the second temperature being higher than the first temperature;
      a district cooling plant which cools incoming cooling fluid of the return conduit from the second temperature to the first temperature, and
      a plurality of cooling devices each configured to absorb heat from its surroundings and deposit the absorbed heat into cooling fluid entering the cooling device from the feed conduit, the heated cooling fluid being returned to the return conduit,
      wherein the cooling fluid is circulated in the district cooling grid by means of a pressure difference between the feed conduit and the return conduit, wherein the pressure in the feed conduit is higher than the pressure in the return conduit;
   a local cooling system being configured to absorb heat from a first building and comprising a heat exchanger having a heat exchanger inlet and a heat exchanger outlet; and
   a local heating system being configured to heat the first or a second building and comprising a heat pump having a heat pump inlet and a heat pump outlet;

wherein the heat exchanger inlet of the heat exchanger of the local cooling system is connected to the feed conduit of the district cooling grid, and wherein the heat pump inlet of the heat pump of the local heating system is connected to the return conduit of the district cooling grid and to the heat exchanger outlet of the heat exchanger of the local cooling system.

2. The system according to claim 1, wherein the heat pump inlet, the heat exchanger outlet, and the return conduit are interconnected.

3. The system according to claim 1, wherein the heat exchanger inlet is further connected to the heat pump outlet.

4. The system according to claim 3, wherein the heat exchanger inlet, the heat pump outlet, and the feed conduit are interconnected.

5. The system according to claim 1, wherein a pump is arranged in the heat pump inlet or in the heat pump outlet, and is configured to overcome the pressure difference between the return conduit and the feed conduit.

6. The system according to claim 5, wherein the local heating system further comprises a first controller configured to control the pump to regulate the flow of cooling fluid flowing through the heat pump.

7. The system according to claim 6, wherein the local heating system further comprises a temperature sensor configured to determine data pertaining to a temperature of the cooling fluid in the outlet of the heat pump, wherein the first controller is configured to control the pump based on the data pertaining to the temperature of the cooling fluid in the outlet of the heat pump.

8. The system according to claim 6, wherein the local heating system further comprises a heat emitter and a heat demand sensor configured to determine data pertaining to heating demands of the heat emitter, wherein the first controller is configured to control the pump based on the data pertaining to heating demands of the heat emitter.

9. The system according to claim 6, wherein the first controller is further configured to control operation of the heat pump.

10. The system according to claim 1, wherein the local cooling system further comprises a flow valve arranged in the heat exchanger inlet or in the heat exchanger outlet, and is configured to regulate the flow of cooling fluid flowing through the heat exchanger.

11. The system according to claim 10, wherein the local cooling system further comprises a second controller configured to control the flow valve to regulate the flow of cooling fluid flowing through the heat exchanger.

12. The system according to claim 11, wherein the local cooling system further comprises a temperature sensor configured to determine a temperature of the cooling fluid in the outlet of the heat exchanger, wherein the second controller is configured to control the flow valve based on the temperature of the cooling fluid in the outlet of the heat exchanger.

13. The system according to claim 1,
wherein a pump arranged in the heat pump inlet or in the heat pump outlet, and configured to overcome the pressure difference between the return conduit and the feed conduit,
wherein the local heating system further comprises a first controller configured to control the pump to regulate the flow of cooling fluid flowing through the heat pump,
wherein the local cooling system further comprises a flow valve arranged in the heat exchanger inlet or in the heat exchanger outlet, and configured to regulate the flow of cooling fluid flowing through the heat exchanger,
wherein the local cooling system further comprises a second controller configured to control flow valve to regulate the flow of cooling fluid flowing through the heat exchanger, and
wherein the first and second controllers are combined as a single controller.

14. The system according to claim 1, wherein the combined cooling and heating system further comprises a further local heating system being configured to heat a third building and comprising a further heat pump having an inlet connected to the return conduit of the district cooling grid and an outlet connected to the feed conduit of the district cooling grid.

* * * * *